United States Patent [19]

Watson, III

[11] 4,446,729

[45] May 8, 1984

[54] SAILING COURSE COMPUTER

[76] Inventor: Roy H. A. Watson, III, 124 Dodds Ct., Burlington, Vt. 05401

[21] Appl. No.: 314,478

[22] Filed: Oct. 23, 1981

[51] Int. Cl.$^3$ ............................................. G01C 21/10
[52] U.S. Cl. ................................ 73/178 R; 33/363 K; 364/447
[58] Field of Search ............ 73/178 R, 181, 182–187; 364/424, 432, 443, 447; 33/363 K

[56] References Cited

U.S. PATENT DOCUMENTS

| | | | |
|---|---|---|---|
| 3,685,352 | 8/1972 | Pounder et al. | 73/178 R |
| 4,107,988 | 8/1978 | Polsky | 73/178 R |
| 4,109,389 | 8/1978 | Balcom | 33/363 K |

Primary Examiner—Donald O. Woodiel
Attorney, Agent, or Firm—Harvey B. Jacobson

[57] ABSTRACT

A sailing course computer instantaneously and continuously computes a sailboat's speed towards a predetermined destination. In a first embodiment, a polarizer disk is utilized as a compass card through which a light source may be directed. An analyzer disk is positioned below the polarizer disk, and a photocell below the analyzer disk then provides a signal indicative of the amount of light passing through the two disks in response to the sailboat assuming various headings. A second signal input is provided by a knotmeter, and appropriate electronic circuitry is then used to indicate the speed of the sailboat towards a given destination. In a second embodiment, a light source is provided on one side of a compass card and a photocell is provided on the other, with a circular aperture being positioned tangentially to the center of the card so as to permit light impingement from the light source upon the photocell. The photocell then provides an electric signal indicative of the amount of light passing through the aperture to a computing circuit for determining the speed relative to the destination. In both embodiments of the invention, the electronic circuitry is utilized to compute the "speed made good to the mark" by multiplying the absolute value of the sailboat's velocity through the water by the cosine of the angle identified between the intersection of a first line in the direction of the destination and a second line defined by the sailboat's forward movement.

8 Claims, 7 Drawing Figures

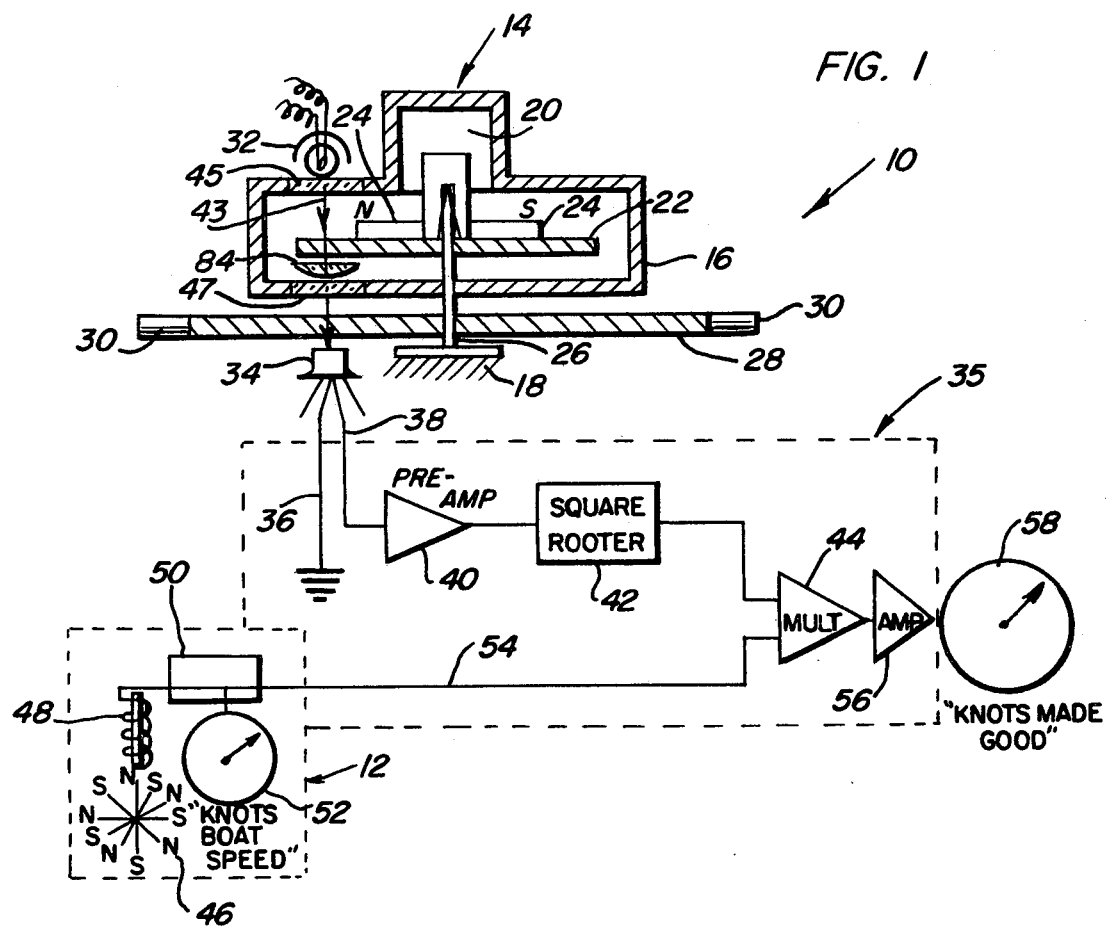
FIG. 1
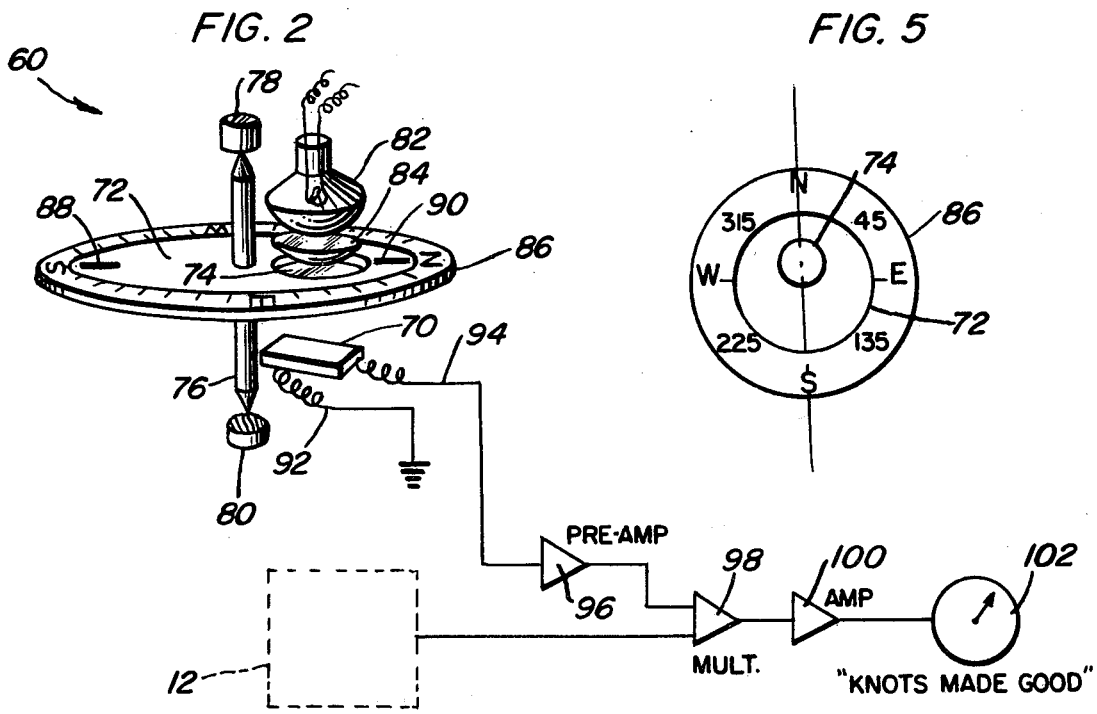
FIG. 2
FIG. 5

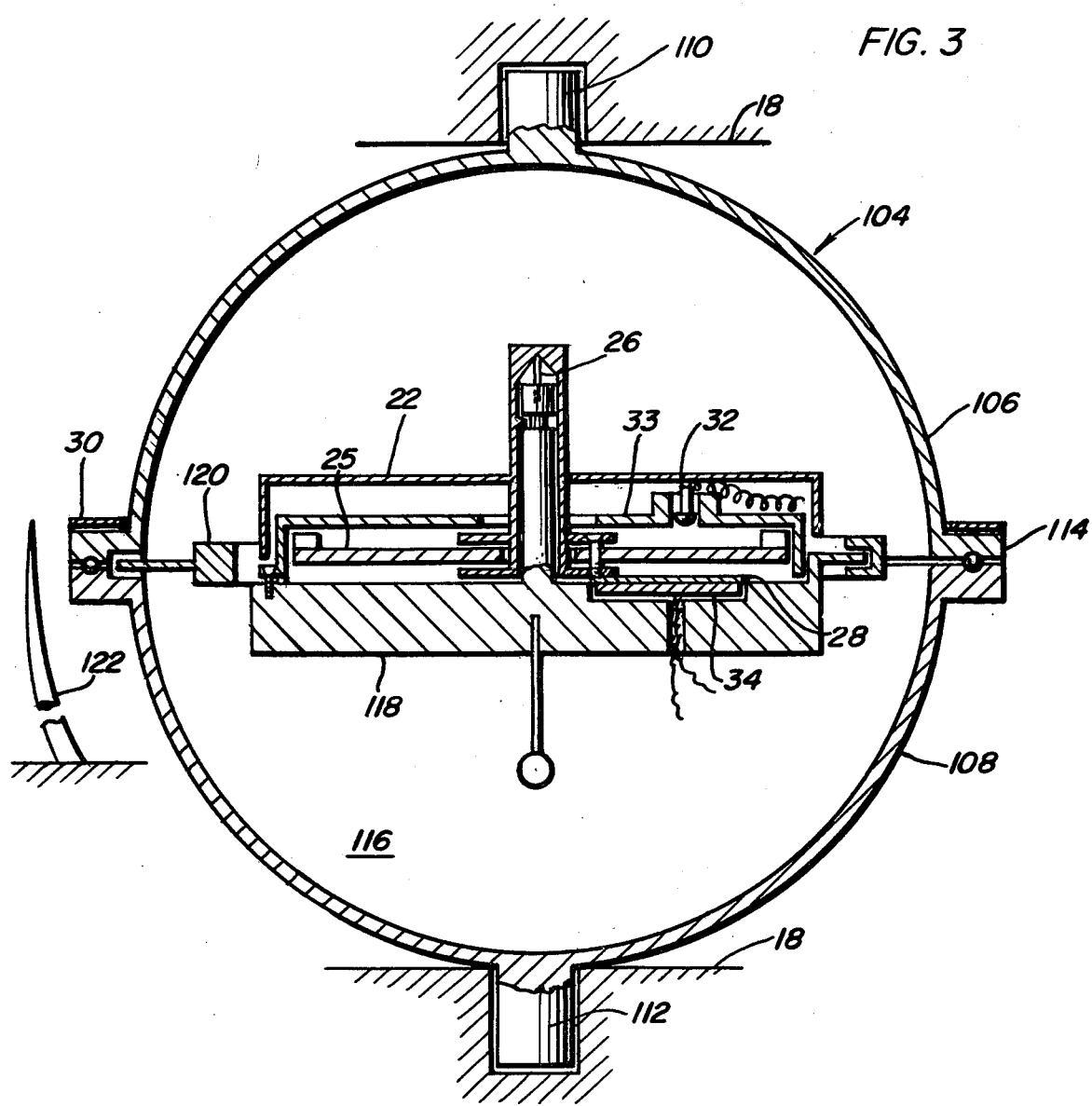
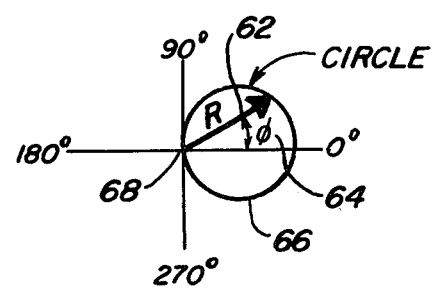

SAILING COURSE COMPUTER

BACKGROUND OF THE INVENTION

1. Field of the Invention

The present invention relates generally to devices for assisting in achieving maximum sailboat speed to a given mark or destination, and more particularly pertains to computers which automatically, instantaneously and continuously calculate and display the magnitude of the velocity vector components of a sailboat so as to achieve maximum speed in reaching a mark.

2. Description of the Prior Art

It is a well understood fact that a sailboat cannot sail directly into the wind. In this respect, a sailboat at best can sail only about 20° to the wind, and at such a heading, the boat's speed through the water is extremely low. As a sailboat "falls off" from the wind, its speed through the water increases, and a boat will reach its maximum speed through the water at about 100° to 120° to the wind, once again decreasing as it approaches a 180° or downwind course. As such, most sailboat race courses are designed to have one of the "legs" of the course located directly upwind. Since a sailboat cannot sail directly upwind, a skipper or operator of a sailboat must choose some course "off" the wind that he thinks will get him to the windward mark in minimum time. In this regard, the skipper would like to attain the maximum "speed made good to the windward mark." However, it is almost impossible to determine the optimum direction, since if the angle is slightly too great, the boat will have a higher speed through the water but will be headed away from the mark at too large an angle so as to not attain the maximum "speed made good to the mark." Conversely, if the angle is too small, the boat will be headed nearer the mark but will have too low a speed through the water and still will not attain maximum "speed made good to the mark." As can be appreciated, the optimum speed-direction combination is the one that maximizes the algebraic product of the speed through the water and the trigonometric cosine of the angle between the direction to the mark and the direction of the speed through the water, i.e., the speed made good to the mark (SMG) is the projection of the velocity vector (V) onto the direct course and may be expressed as:

$$SMG = /V/\cos_\alpha$$

where $\alpha$ is the angle between the sailing course and the direct course and $/V/$ is the magnitude of the velocity of the vessel. In this respect, the speed made good to the mark (SMG) is the component of the speed along the direct course.

As such, it can be appreciated that it is desirable to be able to determine the speed made good to the mark relative to various headings of the sailboat. Although the speed made good and the distance made good may be manually calculated using the speed of the vessel in the water (as read from a knotmeter), the compass reading and the direct course as inputs, such calculations are not readily available and do not permit prompt course corrections in order to maximize both the speed and distance made good. Effectively, the only manner of quickly combining the various parameters of calculate the speed made good is through the use of a computer. In this regard, there are already several sailboat computers on the market. However, they usually require a large amount of input information such as rhumb line direction (direction to the mark), relative wind speed, relative wind direction, and sailboat speed. Additionally, they require a lot of experimental input data, such as boat speed as a function of true and/or relative wind directions, plus different data associated for each of the sails contained in the sail inventory. These inputs are used to generate optimum course directions using rather sophisticated "on-board" computers and programs.

For example, U.S. Pat. No. 4,107,988, issued to Polsky, on Aug. 22, 1978, discloses a navigation aid for sailing vessels which provides a continuous indication of the actual progress towards a selected position, such as a course mark in a sailboat race. The actual progress is indicated in terms of speed made good and/or distance made good so as to enable immediate evaluation of the effect of course changes and variations in vessel performance. To accomplish this, the Polsky device senses the speed of the sailing vessel through the water and an output signal proportional thereto is obtained. Additionally, a sensor which is responsive to deviations from the direct course to the mark and which may be positioned in azimuth in accordance with that course is provided. The sensor is a Hall effect generator responsive to the earth's magnetic field, as well as to the output signal from the speed detector, and the sensor provides an output which is proportional to the product of the speed and the cosine of the angle between the course being sailed and the course to the mark. This output is utilized for the continuous indication of the speed made good by the vessel or may be integrated to indicate the distance made good, and effectively then, the Polsky device operates as a computer.

A similar type of course made good computing apparatus is to be found in U.S. Pat. No. 3,685,352, issued to Pounder et al, on Aug. 22, 1972, wherein the use of a gimbal-mounted magnetometer sensor for detecting the direction of the earth's magnetic field is disclosed. The magnetically sensitive axis of the sensor is aligned with the earth's magnetic field when the boat is headed on a desired course, and the sensor is then locked in a fixed position relative to the boat, with the magnetometer thereafter producing a voltage which is proportional to the cosine of the angular deviation of the boat from the desired course. A voltage signal representing boat speed is coupled with the voltage from the magnetometer in a multiplier to produce a voltage proportional to the vector component of the boat speed in the direction of the desired course. The voltage from the magnetometer sensor may then be fed to a meter to display the angular deviation of the boat from the desired course, and the voltage from the multiplier is fed to a meter to display the boat's velocity vector component in the direction of the desired course.

As opposed to utilizing the earth's magnetic field to sense course directions, U.S. Pat. No. 3,814,910, issued to Palmieri et al, on June 4, 1974, discloses a sailing computer for calculating the velocity made good during operation of a sailing boat by utilizing measured wind angle, wind speed and boat speed in an analog computer with a single multiplier and with linear relations thereout to provide an indication of velocity made good over the angle of sailing into the wind. In this respect, linear relations are substituted for trigonometric relations in the computer so as to present a solution algorithm utilizing the above-mentioned data sources.

As such, it can be appreciated that the use of sailing computers is desirable; however, such computers are severely hampered by the various types of inputs which must be obtained and supplied. Accordingly, it can be seen that it would be desirable to have a computer that would eliminate such inputs as wind speeds, wind directions (both true and relative) and sail characterization data to compute the optimum sailboat course direction. In this respect, the present invention substantially fulfills this need.

SUMMARY OF THE INVENTION

In a first embodiment of the invention, the direction which a sailboat should sail to reach a destination in a minimum time is determined through the use of only two inputs, i.e., sailboat speed and direction of the rhumb line (direction to the destination). In this connection, the boat speed is constantly and continuously inputed in the form of an electrical signal from an electronic knotmeter, while the rhumb line direction is taken from a chart (map) or pelorus and dialed in by hand. Thus, the errors associated with additional instrumentation are eliminated, as are all of the experimental errors produced when characterizing the sails. Specifically, the first embodiment of the invention is computer which utilizes a magnetic directional compass equipped with a "compass card" disk made of a light polarizing material. The polarization axis of the compass card (polarizer) is parallel with the North-South axis of the compass magnets. In the manner of an ordinary magnetic compass, the compass card rotates about a vertical axis and stays aligned with the earth's magnetic North direction and consequently, the polarization axis of the compass card is also concurrently aligned with the magnetic North direction.

Below the compass card is located a light polarization "analyzer" disk. The disk is made of the same light polarizing material as the compass card, and it is manually rotatable about the vertical axis of the compass independently of the compass card. The analyzer disk is affixed to a graduated bezel, and the bezel is located about the periphery of the disk and is graduated in 360 angular degrees. As such, the polarization axis of the analyzer is parallel to the zero-180° axis of the bezel. The light intensity through the polarizer/analyzer is proportional to $COS^2\beta$, where $\beta$ is the angle between them.

Above the compass, there is located an illuminator to provide a source of light of proper wave length so as to stimulate a photoelectric device positioned in a permanent location below the analyzer disk. The photoelectric device can be one of a variety of types that provide an electrical signal change with a change in light impingement (intensity).

Connected to the photoelectric sensor are electronic circuits to amplify the output thereof to a suitable level and a square root obtaining device or "square-rooter" to take the square root of the amplified output of the photo sensor. The square-rooted signal is then fed into a multiplier and multiplied against a signal from an electronic knotmeter (tachometer circuit). The product of the square-rooted output and the knotmeter is the speed made good to the mark.

In a second embodiment of the present invention, an aperture and projected image-type computer is disclosed. Specifically, a voltage signal representing the sailboat velocity or speed is taken off of the boat's electronic speedometer and is fed into a "Course-Cosine-Modulator." The Course-cosine-Modulator utilizes a narrow elongated electricl photoconductive device having a large opaque disk positioned thereabove. The disk contains a transparent circular aperture portion tangent to its center (axis of rotation), and when the disk is rotated, the amount of electrical conductivity created by light striking the unshaded portion of the conductor device will be the cosine function of the angle of rotation. Located concentrically with the opaque disk is a compass card, and the card is in contact with, but is not securely attached to, the disk. For adjusting purposes, the compass card may be forced to rotate with respect to the opaque disk, but sufficient friction will exist to prevent rotation during normal operation. The compass card magnets produce sufficient torque to rotate the opaque disk and compass card assembly in their supporting bearings so as to maintain the North seeking pole pointing to the North.

Inasmuch as the compass card is conventionally graduated into 360 angular degrees with the North seeking pole at the zero degree location, the opaque disk is marked with a reference line (index marks) for adjusting the compass card's angular position with respect to the opaque disk. The reference line is a continuation of an imaginary line passing through the center of the rotational axis as well as the center of the transparent circle.

It is therefore an object of the present invention to provide a sailing computer that has all of the advantages of the prior art sailing computers and none of the disadvantages.

It is another object of the present invention to provide a sailing computer which may be easily and economically manufactured and which is efficient and reliable in its operation.

Yet another object of the present invention is to provide a sailing computer that requires a minimum of input parameters to be supplied for the purpose of obtaining the speed made good to the mark.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic illustration of a first embodiment of the present invention.

FIG. 2 is a schematic illustration of a second embodiment of the present invention.

FIG. 3 is a transverse cross-sectional view of the first embodiment of the present invention.

FIG. 5 illustrates the construction of the opaque disk and compass card as utilized on the embodiment of FIG. 2.

FIG. 6 is a graphical depiction of the theory associated with the embodiment of FIG. 2.

DESCRIPTION OF THE PREFERRED EMBODIMENTS

Figure 4:
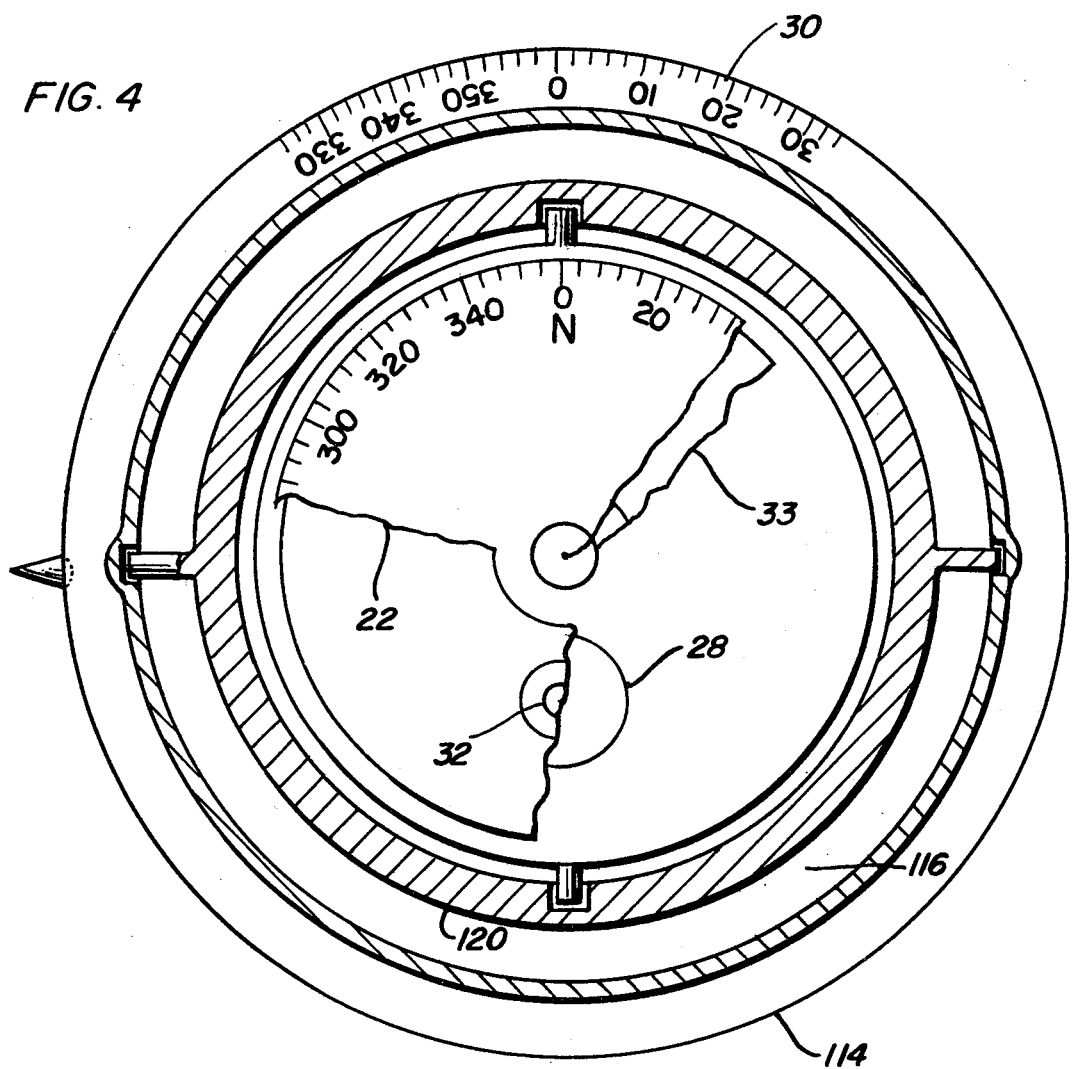
FIG. 4 is a partial top plan view of a portion of the embodiment of FIG. 1.

With reference now to the drawings and in particular to FIG. 1 thereof, a first embodiment of a sailing course computer embodying the principles and concepts of the present invention and generally designated by the reference numeral 10 will be described. The computer 10 automatically and continuously calculates the "speed made good to the mark," thus allowing a pilot to adjust course and maximize the "speed made good to the mark" that is indicated in a special knotmeter instrument 58. Specifically, the knotmeter 12 is in electrical communication with a compass 14 that includes a compass housing 16 mounted to a base 18 forming a part of the structure of a sailboat. The housing 16 is of a sealed construction and is filled with compass oil within chamber 20 so as to maximize the efficiency of and protect the components contained within the housing. In this regard, the compass 14 is of the magnetic directional type, although it could be any type of direction finding-/indicating instrument, such as radio signal seekers, remote compasses, gyros, etc., and is modified to be equipped with a compass card or polarizer disk 22 which is constructed of a light polarizing material. Mounted to the compass card 22 is the conventional compass magnet 24 which operates to indicate the magnetic North direction. The polarization axis of the compass card and polarizer disk 22 is, of course, parallel with the North-South axis of the compass magnet 24 and, as do ordinary magnetic compasses, the compass card rotates about a vertical axis defined by a supporting or balancing pintle 26 on which the compass card is supported.

Below the compass card and polarizer disk 22 is located a light polarization "analyzer" disk 28. The light polarization analyzer disk 28 is made of the same light polarizing material as the compass card or polarizer 22, and can be manually rotated about the vertical axis of the compass independently of the compass card. Additionally, the analyzer disk 28 is affixed to a graduated bezel 30, such bezel being positioned about the periphery of the analyzer disk and being graduated in 360 angular degrees. The polarization axis of the analyzer disk 28 is parallel to the zero-180 degree axis of the bezel 30. The light intensity through the polarizer 22 and the analyzer disk 28 is proportional to the $COS^2 \beta$, where $\beta$ is the angle between them.

Positioned above the polarizer or compass card 22 is an illuminator or light source 32, which would normally consist of no more than a small electric light bulb, such illuminator serving to provide a light source of proper wave length operable to stimulate a photoelectric device 34, such as a conventional photocell, located in a permanent position below the analyzer disk 28. In this regard, the light rays 43 provided by the illuminator 32 pass through clear windows 45, 47 respectively positioned on top and bottom surfaces of the compass housing 16, while the photoelectric device 34 can be one of a variety of types that provide an electrical signal change with a change in light impingement (intensity). Connected to the photo-electric sensor 34 is an appropriate electronic computing circuit 35 operable to amplify the output of the sensor to a suitable level, as well as to take the square-root of the amplified output. In this connection, it can be seen that the photosensor 34 is provided with a first lead 36 operably connected to ground and a second lead 38 which directs the sensed signal to a preamplifier 40. The preamplifier 40 raises the output of the low-level signal received from the photosensor 34 so that the signal may be further processed without appreciable degradation in the signal-to-noise ratio. The amplified signal received from the preamplifier 40 is then directed to a "square-rooter" 42, which may consist of any conventional circuit or electronic device for taking the square root of the analog signal received from the preamplifier 40, much in the manner accomplished by small hand-held electronic calculators conventionally and commercially available, and the signal then obtained from the square-rooter 42 is proportional to the aforementioned $COS \beta$. The square-rooted signal is then fed into a multiplier 44 where it is multiplied against a signal received from the aforementioned electronic knotmeter 12 which is effectively a conventional tachometer circuit.

As illustrated, the knotmeter 12 includes a conventional magnetic paddle wheel 46 which operates in conjunction with a transducer coil 48 to provide a signal indicative of the boat speed in knots, such signal being fed to a conventional circuit 50 included in the knotmeter 12 and being operable to indicate the boat speed through the water on an indicator 52. Specifically, the magnetic paddle wheel 46 is no more than a speed transducer and its rate of rotation is determined by the speed of the boat through the water, each of the individual paddles associated with the wheel being alternately provided with North or South seeking magnets. As these magnets pass near an end portion of the transducer coil 48, an electric current is generated in the coil due to the fluctuating magnetic field, and this current serves as the signal deliverable to the conventional knotmeter circuit 50. As such, the speed of the boat through the water indicated on the indicator 52 is deliverable through a lead 54 to the multiplier 44. The product of the square-rooted output from the photocell 34 and the knotmeter 12 is the above-described "speed made good to the mark". As earlier stated, the "speed made good to the mark" is the product of the "speed through the water" and the cosine of the angle between the mark and the direction of the boat through the water. The resultant light intensity produced by the polarizer 22 and the analyzer 28 is the cosine squared ($COS^2$) function well-known to students of light physics. Since the "square-rooter" produces the cosine function and the electronic knotmeter produces the electrical signal proportional to the "speed through the water," the multiplier 44 produces the algebraic product of the two, i.e., the "speed made good to the mark," and a final amplifier 56 may then be provided to amplify the output of the multiplier 44 so as to provide the desired speed made good to the mark signal to a speed indicator 58.

Whereas the above-described embodiment of the present invention is effectively a polarizer and analyzer system for generating the desired cosine function to effectively obtain the speed made good to the mark, a second embodiment of the sailing course computer 10, as illustrated in FIG. 2, may utilize an aperture and projected image method for generating the desired cosine function. In this respect, the sailing course computer 10 includes a course-cosine-modulator 60 which effectively utilizes a voltage signal representing the boat speed from an electronic speedometer and multiplies the same by the trigonometric cosine of the angle formed by the direction the boat is sailing and the desired course to the mark. Specifically, a speedometer similar in construction to the knotmeter 12 illustrated in the embodiment of FIG. 1 may be utilized to generate electrical impulses through the use of the aforedescribed magnetic water (paddle) wheel 46 exciting a transducer coil 48. As well known, the frequencies of the impulses so generated are directly related to the boat speed, and the speedometer electronics 50 produce a voltage that is proportional to the frequencies of the impulses which is operable to drive an indicating meter 52 normally calibrated to indicate speed in knots.

As illustrated in FIG. 2, the course-cosine-modulator 60 portion of the sailing course computer 10 relies on the theory, as illustrated in FIG. 6, that if a radius vector's 62 length is varied by the cosine of its angle 64 from 270° to 90°, it will generate a circle 66 tangent at the origin 68 to a line perpendicular to a diameter of the circle. As such, FIG. 6 represents a plot of $R = COS\ \phi$. Conversely, it follows that if the radius vector 62 is held fixed and the circle 66 (kept tangent at the origin 68) is rotated through an angle, the length of the radius vector will vary as its cosine.

With this theory in mind, reference is again made to FIG. 2 wherein it can be seen that a very narrow but long photoconductive device 70, such as a photocell, is substituted for the fixed radius vector 62 of FIG. 6. Similarly, a large opaque disk 72 is positioned directly above the photoconductor 70, such disk containing a transparent circle (aperture) portion 74 tangent to the center or axis of rotation of the opaque disk 72 as defined by a pintle or support 76. In this respect, the pintle 76 is held in a vertical and rotatable position by a pair of support bearings 78, 80, and the longitudinal axis of the pintle defines the center of the opaque disk 72. As such, when the opaque disk 72 is rotated, the amount of electrical conductivity created by light striking the unshaded portion of the conductor device 70 will be the cosine function of the angle of rotation. In this regard, light is provided to the photocell 70 through the use of a fixed position illuminator 82 which has its light directed through the transparent aperture 74 by a columnating lens 84 positioned between the illuminator and the aperture.

As can be appreciated, if the transparent circle 74 (and the photoconductor 70) are moved to a new radial position which is no longer tangent to the axis of rotation of the opaque disk 72, then it will be necessary to distort the shape of the transparent aperture in order to still generate the cosine function. Likewise, if the photoconductor 70 is not a linear device, the shape of the aperture 74 must deviate from a circle.

Since it is now understood that the conductivity of a photoconductive device 70 can be made to vary as the cosine of the angle between the fixed photoconductive device and the center of a circular aperture, the present invention incorporates this idea into the course-cosine-modulator 60 through the addition of a direction seeking magnetic compass card 86. As shown in FIG. 5, the compass card 86, along with its magnets, is located concentrically with the opaque disk 72 and in this respect, the compass card is in frictional contact with, but is not securely attached to, the opaque disk. For adjusting purposes, the compass card 86 may be forced to rotate with respect to the opaque disk 72, but sufficient friction will prevent such relative rotation during normal operation. The compass card magnets produce sufficient torque to rotate the opaque disk 72 and compass card 86 assembly in their supporting bearings 78, 80 so as to maintain the North seeking pole in proper alignment with the earth's magnetic North.

Realizing that the compass card 86 is conventionally graduated into 360 angular degrees with its North seeking pole at the zero degree location, the opaque disk 72 may be marked with a reference line or index marks 88, 90 to facilitate an adjusting of the compass card's angular position with respect to the opaque disk. The reference line as defined by a line extending between the index marks 88, 90 is a continuation of an imaginary line passing through the center of the rotational axis, as defined by the pintle 76, and the center of the transparent circle 74. Effectively, the index mark 88 serves as the upwind reference mark, while the index mark 90 serves to identify the downwind reference line.

As with the embodiment of FIG. 1, the photocell 70 has one electrical lead 92 directed to ground and a second lead 94 for delivering a sensed condition to a preamplifier 96. The signal from the preamplifier 96, along with the signal provided by the boat speedometer 12, is deliverable to a multiplier 98 so as to calculate the aforedescribed cosine function, and the signal from the multiplier 98 is deliverable to an amplifier 100. The amplified signal received from the amplifier 100 is then fed to a "knots made good" speedometer 102 which is similar to the speed indicator 58 illustrated in the embodiment of FIG. 1 and which is an electrical voltmeter that has been calibrated to read speed in knots. Specifically, it receives a voltage from the course-cosine-modulator 60 that represents the speed made good along the desired course, and the voltage effectively deflects a pointer which indicates such speed.

FIGS. 3 and 4 have been provided to pictorially illustrate how the construction of the embodiment of FIG. 1 might be incorporated into an existing magnetic compass. In this respect, the construction of the compass illustrated in FIGS. 3 and 4 could similarly be utilized to house the embodiment of FIG. 2; however, to illustrate both the embodiments of FIGS. 1 and 2 operably within an existing compass structure does not appear to be necessary. Continuing then, it can be seen that a conventional magnetic compass 104 would normally include first and second housing halves 106, 108 mounted on respective pivots 110, 112 and being sealed together through the use of a housing sealing flange 114. By this construction, the housing halves 106, 108 define a sealed cavity 116 which may be filled with compass oil and which serves to contain the aforedescribed structure of FIG. 1. As shown, the compass rotational axis may be defined by the aforementioned pintle 26, such pintle serving to support the structure in a gimbaled plane 118 proximate to the gimbal ring 120 normally associated with a magnetic compass 104. The compass card 22 may be rotatably mounted on the pintle 26 above the illuminator bulb 32. In this respect, the illuminator bulb 32 is held in place through the use of a light shield and illuminator support 33, while the polarizer disk 25 may be mounted separately from the compass card 22 and below the illuminator bulb 32 in the manner illustrated. By this token, an analyzer disk 28 is positioned below the polarizer disk 25 and over the top of the aforementioned photocell 34 whereby a light responsive signal is deliverable to the photocell in response to a movement of the polarizer disk.

Further illustrated in FIGS. 3 and 4 is the fact that the graduated bezel 30 would normally be positioned on a topmost portion of the housing sealing flange 114 while a reference mark pointer 122 would be provided. Further, the housing pivots 110, 112 are normally mounted within the boat structure or base 18.

To utilize the embodiment of FIG. 1, it should be first realized that a skipper of a sailboat would know the magnetic compass direction to the windward mark from his present position and if the windward mark were to be due East (90 compass degrees) and the wind was coming from due East, it can be appreciated that the sailboat would not be able to sail directly towards the mark because it is directly upwind. Thus, the skipper would manually rotate the analyzer bezel 30 until the 90° graduation on the bezel is aligned with the center line of the boat (straight ahead). An index mark or pointer could be provided to indicate the center line of the boat. If the analyzer 28 and the polarizer 22 are rotated until their axes of polarization are aligned in parallel, the light transmitted through to the photosensor cell 34 will be at a maximum, i.e., 100% or unity. By the same token, if the axes are rotated 90° to each other, light extinction is achieved, i.e., zero percent or zero. As such, the light intensity transmitted through the polarizer 22 and the analyzer 28 varies as the cosine squared of the angle ($COS^2\beta$). In this regard, the electrical output of the photosensor 34 varies linearly as the intensity of the impinging light and therefore, due to the polarizer/analyzer, the electrical signal from the photosensing cell 34 also varies as the cosine squared of the angle. The electric "square-rooter" operates on the photosensor 34 output and yields the cosine of the angle ($COS\beta$) and in the above example, if the skipper had selected a course of 45° off the wind, which would be 45° if on a starboard tack or 135° compass heading if on a port tack, the light transmitted through the polarizer and analyzer would have been 0.5 $(0.707)^2$ of the maximum. The photosensor 34 would have had an output signal equal to $(0.707)^2$ or ($COS^2 45°$). Of course, it may normally be necessary to take the signal from the photosensor 34, particularly if it is of the photovoltaic type which provides small signals, and amplify it to a usable level before taking the square root, as through the use of the illustrated preamplifier 40.

After the square root of the photosensor signal is taken, it is passed to a multiplier 44, while the signal from the "through the water" knotmeter 12 is also inputed to the multiplier, and the two signals are multiplied together producing the product of the speed through the water and the cosine of the angle formed by the direction of the mark and the direction through the water. This is the signal representing the "speed made good to the mark," and it is then inputed into an analog current meter 58 that is labeled "speed made good to the mark."

The signal representative of the speed through the water is provided by the "through the water" knotmeter 12, which as above described is a typical electronic knotmeter that receives a signal from a magnetic paddle wheel 46 that excites a transducer coil 48. The frequencies of the excitations are proportional to the speed of the water passing under the boat, such frequencies being transformed into direct current signals by electronic circuits 50, similar to those found in electronic automobile tachometers. The direct current signal is used to drive an ammeter, such technique being commonly used in modern boat knotmeters. Similarly, the multiplier 44 may be an operational amplifier used in the multiplier mode so as to effectively combine the signal provided by the square-rooter 42 and the knotmeter 12.

Figure 7:
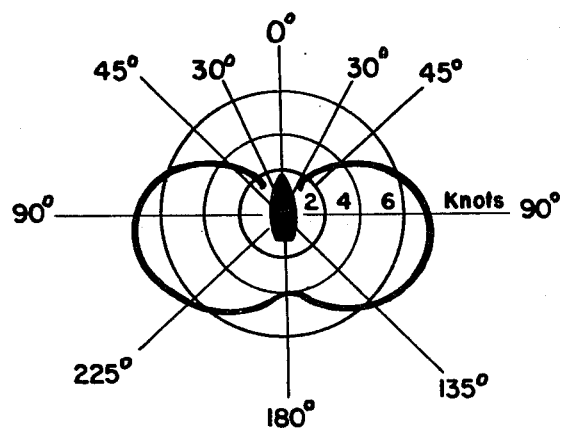
FIG. 7 is a graphical depiction of sailboat speed as a function of its direction to the wind.

To understand the operation of the embodiment of FIG. 2, it must again be reiterated that a sailboat cannot sail directly into the eye of the wind and in fact, if a sailboat was headed into the eye of the wind, the boat would stop its forward motion and drift backwards. As aforementioned, about 20° to 30° is as close to the eye of the wind that most boats can sail, and even then the sails can barely drive the boat forward. As the boat "falls off" the wind to 40°, 50° or 60°, the sails become more effective thus increasing the forward drive and resulting in a faster boat speed. FIG. 7 has been provided to illustrate a typical polar graph of boat speed as a function of wind direction. It should be noted from the polar plot that the maximum boat speed occurs when the wind is about 100° and not when the wind is directly astern. By example, suppose that the first leg of a sailboat race is a windward or "weather" leg. Before the race, the skipper would consult his charts to determine the direction (rhumb line) of the windward mark from the starting line. Knowing that a straight line in this direction is the shortest distance to the windward mark, the skipper also knows he cannot sail this line because it is directly (or approximately within plus or minus 20°) into the wind. This, of course, means that the skipper would like to select another line which would yield him the shortest time to an intermediate position where he will have to tack (change direction by about 80° to 90° and then resume a direction indirectly towards the mark).

To make the adjustments necessary to accomplish the purpose of the present invention, the skipper need only to rotate the aperture circle index mark 90 to line up with the compass card number representing the direction of the rhumb line. The photoconductive device 70 is permanently fixed to the boat forwardly of the compass card axis and along the center line of the boat. Considering the situation where the boat would be heading in the same direction as the rhumb line, the aperture will expose 100% of the photoconductor to the photo-irradiation which provides 100% of its available conductivity. As such, the speedometer voltage will be modulated by a factor of one which is the cosine of zero degrees. Effectively then, the same circuitry is employed as in the embodiment of FIG. 1, with the exception, of course, that the square-rooter 42 is no longer required, to indicate that the maximum speed made good to the mark is being realized.

In summary, the present invention provides a simplified approach for determining the direction a sailboat should sail to reach a destination in minimum time. The invention requires only two inputs, i.e., boat speed and direction of the rhumb line, and the boat speed is constantly and continuously inputed in the form of an electrical signal from an electronic knotmeter. The rhumb line direction may always be taken from a chart (map) or from a pelorus and dialed in by hand. No other inputs are necessary. The invention eliminates the errors of all of the additional instrumentation, as well as the experimental errors produced when characterizing the sails. In this respect, inputs such as wind speeds, wind directions (both true and relative) and sail characterization data are not necessary to compute the optimum sailboat course direction. In fact, such inputs are always a source of unnecessary errors which severely effects the computation of instantaneous speed towards a destination.

The compass card and magnet assembly (the rotating portion of a compass) of a typical, magnetic, North-/South direction seeking compass produces a very low torque during its restituion process. Because of the low torque capability, it is not feasible to attach mechanisms for doing work, such as attaching displacement transducers to send signals of compass headings, since the same would load the system and cause errors. As such, it can be further appreciated that the non-loading, non-contacting technique employed by the present invention is even further invaluable.

While two different ways to design the compass/modulator portion of the present invention have been disclosed, i.e., the "polarizer/analyzer system" and the "aperture/projected image system," many different forms of optical encoders could also be used to produce the cosine function. For example, one way is to gradually vary a density filter in order to vary the transmitted light to produce a cosine function. Such a filter can be constructed by applying a continuous photo-sensitive coating on a clear glass substrate and varying the exposing light (photoprocess) in a cosine fashion. Another way to build a cosine function generator filter is to selectively vary the spacing (density) between small opaque dots, squares or other geometric shapes placed on a clear glass substrate whereby varying degrees of light density transmittance may be realized. Still another technique is to vary the thickness of a thin film metal coating as practiced in the production of partial mirrors. Each of these techniques described are analog light modulator devices, and by the same token, a digital technique could be employed since many digital optical encoder/decoder systems are used for angle measurements on rotating shafts. This technique could be readily applied to the present invention and is very compatible with digital readout display systems and microprocessers of today.

With respect to the above description, it should be realized that the optimum dimensional relationships for the parts of the invention are deemed readily apparent and obvious to one skilled in the art to which the invention pertains, and all equivalent relationships to those illustrated in the drawings and described in the specification, to include modification of form, size, function, arrangement of parts and details of operation, are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A sailing course computer for instantaneously and continuously indicating the speed of a sailboat through a body of water towards a destination, said computer comprising:

speed determining means for providing a first signal representative of said sailboat's velocity through said body of water along a path of forward movement;

direction indicating means for providing a second signal proportional to an angle determined by an intersection of a first line directed from said sailboat to said destination and a second line directed along said path of forward movement of said sailboat:

computing means for combining said first and second signals to indicate said speed of said sailboat toward said destination irrespective of the instantaneous direction of movement of said sailboat through said body of water, said computing means being operable to determine said speed toward said destination by multiplying an absolute value of said sailboat's velocity by a cosine of said angle, and including an electronic circuit having an operational amplifier mode to effect said multiplication of the velocity and said cosine of said angle, said direction indicating means including compass card means rotatable about an axis for indicating a North and South direction and bezel means circumferentially positioned about the compass card means, said compass card means being constructed of a polarizing material and an analyzer disk means also constructed of a polarizing material and positioned proximate to the compass card means for regulating light passing through said compass card means during rotation thereof, and means responsive to the light passing through the compass card means and the analyzer disk means for producing the second signal.

2. The sailing course computer as defined in claim 1, and further wherein a light source is provided proximate to a surface of said compass card means so as to direct light rays through said compass card means and said analyzer disk means, and a photosensor means is provided proximate to a surface of said analyzer disk means so as to be in a sensing position relative to said light rays thereby to provide said second signal to said computing means.

3. The sailing course computer as defined in claim 1, wherein said speed determining means includes an electronic knotmeter for providing said first signal representative of said sailboat's velocity in water.

4. The sailing course computer as defined in claim 1, wherein said second signal is provided by a photosensor means responsive to a change in intensity of light rays passing through said direction indicating means.

5. A sailing course computer for instantaneously and continuously indicating the speed of a sailboat through a body of water towards a destination, said computer comprising:

speed determining means for providing a first signal representative of said sailboat's velocity through said body of water along a path of forward movement;

direction indicating means for providing a second signal proportional to an angle determined by an intersection of a first line directed from said sailboat to said destination and a second line directed along said path of forward movement of said sailboat;

computing means for combining said first and second signals to indicate said speed of said sailboat toward said destination irrespective of the instantaneous direction of movement of said sailboat through said body of water, said computing means being operable to determine said speed toward said destination by multiplying an absolute value of said sailboat's velocity by a cosine of said angle, and including an electronic circuit having an operational amplifier provided therein operative in a multiplying mode to effect said multiplication of the velocity and said cosine of said angle, said direction indicating means including compass card means rotatable about an axis for indicating North and South direction and bezel means circumferentially positioned about said compass card means, said compass card means being provided with a circular aperture in tangential relation to said rotational axis of said compass card means, said aperture serving to regulate light passing therethrough and photosensor means receiving the light passing through the aperture for producing said second signal fed to said computing means.

6. The sailing course computer as defined in claim 5, and further wherein a light source is provided proximate to a first side of said compass card means, said light source serving to direct light rays through said aperture so as to impinge upon said photosensor means, said photosensor means being located proximate to a second surface of said compass card means.

7. In a device for navigating a course toward a predetermined destination, having speed determining means for providing a first signal representing instantaneous heading velocity, direction indicating means for providing a second signal representing angular relationship between said heading velocity and the course toward the destination, and signal computing means for combining said first and second signals, said direction indicating means including a compass card rotatable about an axis, the improvement residing in said direction indicating means further including optical means for regulating light passing through the compass card, and means responsive to the light regulated by the optical means for generating said second signal, said optical means comprising an analyzer disk through which the light passes, said compass card and the analyzer disk being rotatable relative to each other and made of a polarizing material.

8. In a device for navigating a course toward a predetermined destination, having speed determining means for providing a first signal representing instantaneous heading velocity, direction indicating means for providing a second signal representing angular relationship between said heading velocity and the course toward the destination, and signal computing means for combining said first and second signals, said direction indicating means including a compass card rotatable about an axis, the improvement residing in said direction indicating means further including optical means for regulating light passing through the compass card, and means responsive to the light regulated by the optical means for generating said second signal, said optical means comprising a circular aperture formed in the compass card in tangential relation to the rotational axis of the card, the light being regulated by rotation of the compass card while the light is passing through the aperture.

* * * * *